April 5, 1955

I. J. THOMAS 2,705,416

HYDRAULIC TORQUE GENERATORS

Filed Jan. 28, 1952

INVENTOR
Ivor John Thomas
by Albert H. Jacobs
atty.

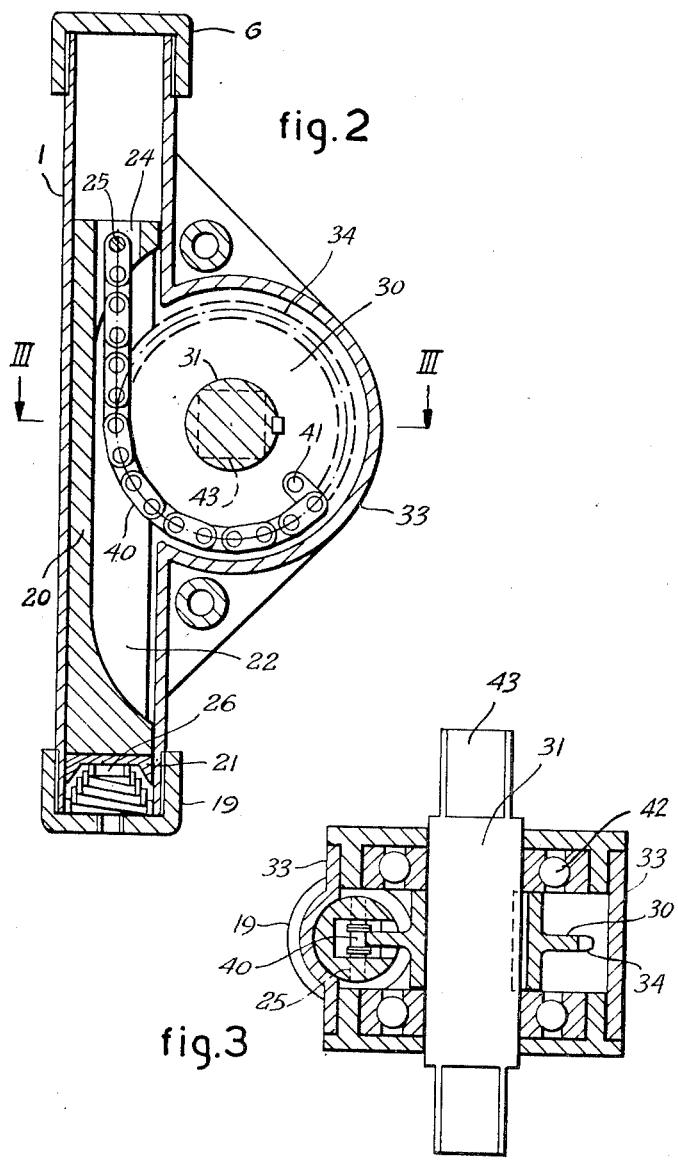

United States Patent Office 2,705,416
Patented Apr. 5, 1955

2,705,416

HYDRAULIC TORQUE GENERATORS

Ivor John Thomas, Cardiff, Wales, assignor to Acratork Engineering Company Limited, Cardiff, Wales, a company of Great Britain and Northern Ireland Application January 28, 1952, Serial No. 268,472

4 Claims. (Cl. 73—1)

This invention relates to hydraulic torque generators and has for its chief object to provide a torque generator of simple construction and capable of producing a torque reaction limited only by the size of the apparatus particularly suitable for engineering shop use and experimental development work in the laboratory.

According to the invention, a hydraulic torque generator comprises a cylinder component and a piston component, a rotary member (sprocket wheel) operatively associated with said piston component, a hydraulic generating means connected with the cylinder component and means indicating the torque load induced at the axis of the rotary member. Means may be provided for determining the torque by the pressure of the fluid, or alternatively means are provided for indicating torque at reaction points relatively remote from the axis of said sprocket shaft.

Referring to the drawings filed herewith:

Figure 2 is a longitudinal sectional elevation of the torque generator shown in Figure 1.

Figure 3 is a transverse section on the line III—III of Figure 2.

Figure 1:
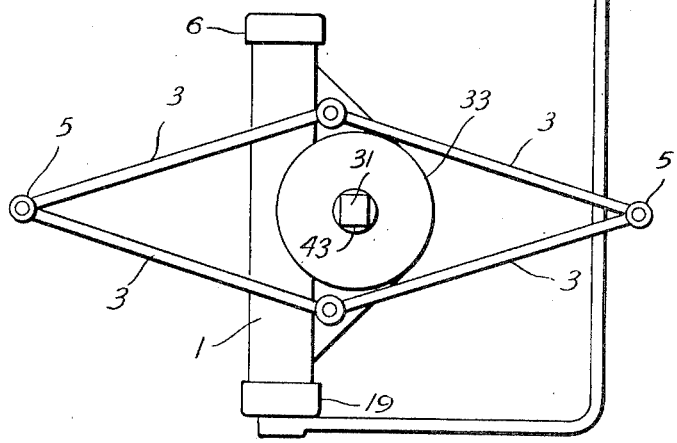
Figure 1 is a general arrangement drawing of hydraulic apparatus embodying one form of torque generator made in accordance with the present invention.

In the form shown in the drawings the hydraulic apparatus comprises a cylinder 1 having a feed cap 6 and supported on rods 3 from torque reaction points 5, the cylinder being coupled by the high pressure conduit 7 to the output of a hand pump 10 mounted on the fluid tank 11 and adapted to be operated by the hand lever 12, a pressure gauge 13 being provided, operated by the fluid pressure generated by the pump 10 and calibrated to indicate the torque exerted by the torque generator which will now be described in greater detail with reference to Figures 2 and 3.

In these figures, the torque generator consists of a tubular cylinder component 1 closed at one end by a cap 19 and at the other end by a cap 6, but threaded to receive the end coupling of the high pressure conduit 7 from the hydraulic hand pump 10. The cylinder 1 is fitted with a piston component comprising a driving piston 20 and a sealing piston 21 movable within the cylinder 1 under the hydraulic pressure applied. The driving piston 20 is milled intermediate its ends with a longitudinal groove 22 and the end remote from the head is slotted at 24 and drilled transversely to receive a chain retainer pin 25. The sealing piston 21 is held against the driving piston 20 by a spring 26 and provides an hydraulic seal within the cylinder. A sprocket member 30 mounted on a shaft 31 is housed within a transverse cylindrical extension 33 of the cylinder component 1, the teeth 34 of the sprocket 30 projecting into the groove 22 of the driving piston 20, the axis of the piston 20 being tangential to the pitch circle of the teeth 34 of sprocket 30, the shaft 31 being at right angles to the longitudinal axis of the cylinder 1. The driving piston 20 is coupled to the sprocket wheel 30 by means of a chain 40, one end of which is secured to the piston by the pin 25, and the other end of which is secured to the sprocket member by the pin 41, the chain engaging the teeth 34 of the sprocket 30.

The sprocket shaft 31 is mounted in ball bearings 42 within the housing 33, the shaft 31 having squared ends 43 for connection with the apparatus to be tested against the pressure developed in the torque generator by the hand pump 10.

Alternatively to fitting the apparatus to be tested direct to the shaft of the torque converter, a rectangular or other frame may be fitted to surround the shaft and provided with movable indicators which can be placed optionally in position on the frame for comparison purposes.

The invention is particularly useful in the calibration or setting of torque spanners forming the subject of British Patent No. 625,477, the spanner head being applied to squared end 43 of the shaft 31 with the handle bearing against the reaction point 5. Pressure then applied by the pump 10 can be maintained until the torque spanner provides the requisite reaction, the spring of the torque spanner being adjusted until the desired result is obtained.

What I claim and desire to secure by Letters Patent is:

1. A hydraulic torque generator comprising a cylinder having an opening at one end and a piston lying within said cylinder, a hydraulic pump to drive said piston, a feed conduit connecting said hydraulic pump with the opening in said cylinder, said piston comprising a driving piston and a sealing piston, a square ended torque shaft mounted in a transverse extension of said cylinder, a sprocket wheel mounted on said torque shaft, a sprocket chain connected to said sprocket wheel and to said driving piston for driving said sprocket wheel from said driving piston, and a fluid pressure gauge connected to said feed conduit to indicate the torque load on said sprocket wheel, the axis of the driving piston being tangential to the pitch circle of the sprocket wheel.

2. A hydraulic torque generator in accordance with claim 1, in which said driving piston is provided with a longitudinal groove, and in which the teeth of said sprocket wheel project into the groove of said driving piston.

3. A hydraulic torque generator in accordance with claim 1, in which said sealing piston lies between said driving piston and said open end of the cylinder, and in which a spring is interposed between said sealing piston and the open end of the cylinder.

4. A hydraulic torque generator in accordance with claim 1, in which torque reaction points are mounted on the cylinder substantially removed from the shaft of said sprocket wheel.

References Cited in the file of this patent

UNITED STATES PATENTS

| | | |
|---|---|---|
| 2,001,711 | Dinzl | May 21, 1935 |
| 2,190,967 | Zimmerman | Feb. 20, 1940 |
| 2,411,931 | McVey | Dec. 3, 1946 |
| 2,520,731 | MacDuff | Aug. 29, 1950 |
| 2,585,389 | Kehrl | Feb. 12, 1952 |

FOREIGN PATENTS

| | | |
|---|---|---|
| 324,782 | Great Britain | Feb. 6, 1930 |